United States Patent [19]
Lovell et al.

[11] Patent Number: 5,379,330
[45] Date of Patent: Jan. 3, 1995

[54] INNER FILTER REMOVAL TOOL

[75] Inventors: Robert K. Lovell; Robert S. Tsukida; Frank Ortega; Thomas W. White, all of San Jose, Calif.

[73] Assignee: General Electric Company, San Jose, Calif.

[21] Appl. No.: 135,779

[22] Filed: Oct. 12, 1993

[51] Int. Cl.6 .............................................. G21C 19/00
[52] U.S. Cl. .................................. 376/260; 376/313; 210/237; 294/94
[58] Field of Search ............... 376/260, 264, 268, 271, 376/313, 233; 294/86.25, 94, 95; 210/232, 237, 238, 470, 471; 414/146

[56] References Cited

U.S. PATENT DOCUMENTS

| | | | |
|---|---|---|---|
| 2,719,051 | 9/1955 | Hankins | 294/86.25 |
| 3,604,746 | 9/1971 | Notari | 376/233 |
| 3,838,289 | 9/1974 | White | 376/260 |
| 4,340,249 | 7/1982 | Bucklew | 294/95 |
| 4,572,710 | 2/1986 | Stock et al. | 376/260 |
| 5,017,330 | 5/1991 | Hurdiel | 376/260 |

OTHER PUBLICATIONS

GE Manual, "Control Rod Drive-Model 7RDB144B", Inner Filter Assembly Tool, p. 21, May 1971.

Primary Examiner—Daniel D. Wasil
Attorney, Agent, or Firm—J. E. McGinness

[57] ABSTRACT

An improved tool for removing the highly contaminated inner filter from a control rod drive during a maintenance operation. The tool may also be used to install the inner filter by pushing the inner filter on and locking the spring clip onto flats of the center lug of the control rod drive stop piston. The tool has a collet with flexible fingers which are inserted inside the inner filter while flexed radially inward. After the collet is inserted, a retractable cam with a conical bearing surface is retracted to a position whereat it urges the collet fingers radially outward to clamp the collet onto the inner filter. The locked filter must be rotated before removal. With the inner filter coupled to the collet, the tool is then pulled out to remove the inner filter from the control rod drive.

20 Claims, 7 Drawing Sheets

INNER FILTER REMOVAL TOOL

FIELD OF THE INVENTION

This invention relates generally to maintenance of a control rod drive of a boiling water reactor. Specifically, the invention relates to tools for dismantling or assembling a control rod drive during a maintenance operation.

BACKGROUND OF THE INVENTION

Control rod drives (CRDs) are used to position control rods in boiling water reactors (BWRs) to control the fission rate and fission density, and to provide adequate excess negative reactivity to shutdown the reactor from any normal operating or accident condition at the most reactive time in core life. Referring to FIG. 1, each CRD is mounted vertically in a CRD housing 10 which is welded to a stub tube 8, which in turn is welded to the bottom head of the reactor pressure vessel 4. The CRD flange 6 is bolted and sealed to the flange 10a of the CRD housing 10, which contains ports for attaching the CRD hydraulic system lines 80, 81. Demineralized water supplied by the CRD hydraulic system serves as the hydraulic fluid for CRD operation.

As shown schematically in FIG. 1, the CRD is a double-acting, mechanically latched hydraulic cylinder. The CRD is capable of inserting or withdrawing a control rod (not shown) at a slow controlled rate for normal reactor operation and of providing rapid control rod insertion (scram) in the event of an emergency requiring rapid shutdown of the reactor. A locking mechanism in the CRD permits the control rod to be positioned at 6-inch (152.4-mm) increments of stroke and to be held in these latched positions until the CRD is actuated for movement to a new position. A spud 46 at the top of the index tube 26 (the moving element) engages and locks into a socket at the bottom of the control rod. Once coupled, the CRD and control rod form an integral unit which must be manually uncoupled by specific procedures before a CRD or control rod may be removed from the reactor.

When installed in the reactor, the CRD is wholly contained in housing 10. The CRD flange 6 contains an insert port 66, a withdraw port 70 and an integral two-way check valve (with a ball 20). For normal drive operation, drive water is supplied via an associated hydraulic control unit (HCU) to the insert port 66 for drive insertion and/or to withdraw port 70 for drive withdrawal. For rapid shutdown, reactor pressure is admitted to the two-way check valve from the annular space between the CRD and a thermal sleeve (not shown) through passages in the CRD flange, called scram vessel ports. The check valve directs reactor pressure or external hydraulic pressure to the underside of drive piston 24.

Referring to FIGS. 2A and 2B, the CRD further comprises an inner cylinder 57 and an outer tube 56, which form an annulus through which water is applied to a collet piston 29b to unlock index tube 26. The internal diameter of inner cylinder 57 is honed to provide the surface required for expanding seals 65 on the drive piston 24. A collet housing 51 (which is part of outer tube 56) is provided with ports 73 to permit free passage of water from the clearance space between the outer diameter of index tube 26 and the inner diameter of inner cylinder 57 and the inner diameter of collet housing 51. The bottom of collet piston 29b normally rests against a spacer 52 in the upper portion of the annular space. Grooves in the spacer permit the passage of water between the bottom of the collet piston 29b and the passage area within the cylinder, tube and flange.

Welded pipes 80 and 81, installed in the CRD housing, port water to the insert port 66 and the withdraw port 70 respectively. A port 69 below outer tube 56 connects to withdraw port 70 in CRD flange 6 so that water is applied through the annulus to collet piston 29b when a withdraw signal is given.

The CRD is secured to the CRD housing flange 10a by eight mounting bolts (not shown). A pressure-tight seal is effected between the mated flanges by O-ring gaskets (not shown) mounted in a spacer 7 secured to the CRD flange face.

Insert port 66 contains a ball check valve which consists of check-valve ball 20, ball retainer 21, and retainer O-ring 22. This valve directs HCU accumulator pressure or reactor pressure to the underside of drive piston 24 during scram operation. Port 66 is connected internally to the annulus and the bottom of drive piston 24 and serves as the inlet for water during normal insertion or scram. Water enters this port for a brief period in response to a withdraw signal to move the index tube 26 upward so that collet fingers 29a are cammed out. Following this brief unlocking period, water from below drive piston 24 is discharged through port 66 and through the under-piston hydraulic line for the duration of the withdraw signal. During the time the CRD remains stationary, cooling water passes through an annulus internal to flange 6 to the area between outer tube 56 and the inside of the thermal sleeve to cool the CRD.

The withdraw port 70 serves as the inlet port for water during control rod withdrawal and as the outlet port for water during normal or scram insertion. It connects with internal porting and annuli to the area above drive piston 24. During a withdraw operation, water is supplied from port 70 through a small connecting port in CRD flange 6 to the annular space between outer tube 56 and inner cylinder 57 for application to the bottom of collet piston 29b.

The locking mechanism consists of collet fingers 29a, collet piston 29b, barrel 35, guide cap 39, and collet spring 31. The mechanism is contained in the collet housing 51 portion of outer tube 56 and is the means by which index tube 26 is locked to hold the control rod at a selected position.

The collet assembly consists of a collet piston 29b fitted with four piston seal rings, two outer 28 and two inner 27, six fingers 29a and a retainer (not shown) and is set into a bore in the collet housing 51. In addition, a spring 31, barrel 35 and guide cap 39 complete the components installed in the collet housing 51.

Guide cap 39 is held in place above the collet by three plugs 37 which penetrate the upper end of collet housing 51, and which are held in place by fillister-head screws. It provides a fixed camming surface to guide collet fingers 29a upward and away from index tube 26 when unlocking pressure is applied to collet piston 29b. Barrel 35 is installed below guide cap 39 and serves as fixed seat for collet spring 31.

The collet mechanism requires a hydraulic pressure greater than reactor pressure to unlock for CRD-withdraw movement. A preload is placed on collet spring 31 at assembly and must be overcome before the collet can be moved toward the unlocked position. For control rod withdrawal, a brief insert signal is applied to move index tube 26 upward to relieve the axial load on collet fingers 29a, camming them outward against the sloping lower surface of index tube locking notch 55. Immediately thereafter, withdraw pressure is applied. In addition to moving index tube 26 downward, this pressure is at the same time applied to the bottom of collet piston 29b to overcome the spring pressure and cam the fingers 29a outward against guide cap 39. When the withdraw signal ceases, the spring pressure forces the collet downward so that fingers 29a slip off guide cap 39. As index tube 26 settles downward, collet fingers 29a snap into the next higher notch and lock. When collet fingers 29a engage a locking notch 55, collet piston 29b transfers the control rod weight from index tube 26 to the outer tube 56.

Unlocking is not required for CRD insertion. The collet fingers are cammed out of the locking notch as index tube 26 moves upward. The fingers 29a grip the outside wall of index tube 26 and snap into the next lower locking notch for single-notch insertion to hold index tube 26 in position. For scram insertion, index tube 26 moves continuously to its limit of travel during which the fingers snap into and cam out of each locking notch as index tube 26 moves upward. When the insert, withdraw or scram pressures are removed, index tube 26 settles back, from the limit of travel, and locks to hold the control rod in the required position.

The drive piston 24 and index tube 26 are the primary subassembly in the CRD, providing the driving link with the control rod as well as the notches for the locking mechanism collet fingers. Drive piston 24 operates between positive end stops, with a hydraulic cushion provided at the upper end only. Index tube 26 is a nitrided stainless-steel tube threaded internally at both ends. The spud 46 is threaded to its upper end, while the head of the drive piston 24 is threaded to its lower end. Both connections are secured in place by means of bands 25, 25' with tab locks.

There are 25 notches machined into the wall of index tube 26, all but one of which are locking notches 55 spaced at 6-inch intervals. The uppermost surfaces of these notches engage collet fingers 29a, providing 24 increments at which a control rod may be positioned and preventing inadvertent withdrawal of the rod from the core. The lower surfaces of the locking notches slope gradually so that the collet fingers cam outward for control rod insertion.

Drive piston 24 is provided with internal (62, 71, 72) and external seal rings (65), and is operated in the annular space between piston tube 15 and inner cylinder 57. Internal (63) and external (64) bushings prevent metal-to-metal contact between drive piston 24 and the surface of piston tube 15 and the wall of inner cylinder 57 respectively.

When a control rod is driven upward to its fully inserted position during normal operation or scram, the upper end of the piston head contacts the spring washers 30 which are installed below the stop piston 33. Washers 30 and stop piston 33 provide the upper limit of travel for drive piston 24. The spring washers, together with the series of buffer orifices 53 in the upper portion of piston tube 15, effectively cushion the moving drive piston 24 and reduce the shock of impact when the piston head contacts the stop piston.

The magnet housing, which comprises the lower end of drive piston 24, contains a ring magnet 67 which actuates the switches of the position indicator probe (not shown) to provide remote electrical signals indicating control rod position.

The piston tube assembly forms the innermost cylindrical wall of the CRD. It is a welded unit consisting of piston tube 15 and a position indicator tube 61. The piston tube assembly provides three basic functions for CRD operation: (a) position indicator tube 61 is a pressure-containing part which forms a drywell housing for a position indicator probe 12a (see FIG. 2A); (b) piston tube 15 provides for the porting of water to or from the upper end of the piston head portion of drive piston 24 during rod movement; and (c) during control rod scram insertion, buffer orifices 53 in piston tube 15 progressively shut off water flow to provide gradual deceleration of drive piston 24 and index tube 26.

A stud 59 is welded to the upper end of tube piston 15. Stud 59 is threaded for mounting the stop piston 33. A shoulder on the stud, just below the threaded section, is machined to provide a recess for the spring washers 30 that cushion the upward movement of drive piston 24.

The tube section 15a and head section 15b of piston tube 15 provide space for position indicator tube 61, which is welded to the inner diameter of the threaded end of head section 15b and extends upward through the length of tube section 15a, terminating in a watertight cap near the upper end of the tube section. Piston tube 15 is secured by a nut 16 at the lower end of the CRD. Two horizontal ports are provided in the head section 15b, 180° apart, to transmit water between the withdraw porting in the CRD flange and the annulus between indicator tube 61 and tube section 15a of piston tube 15 for application to the top of drive piston 24. Three O-ring seals 18 are installed around head section 15b. Two seal the bottom of the CRD against water leakage and one seals the drive piston 24 under-piston pressure from the drive piston over-piston pressure.

The position indicator probe 12a, which is slidably inserted into indicator tube 61, transmits electrical signals to provide remote indications of control rod position and CRD operating temperature. Probe 12a is welded to a plate 12b, which plate is in turn bolted to housing 12. Housing 12 is secured to the CRD ring flange 17 by screws 13. A cable clamp (not shown), located at the bottom of a plug 14, secures a connecting electrical cable (not shown) to plug 14. Ring flange 17 is in turn secured to the CRD housing by screws 9. Thus, probe 12a, housing 12 and cable clamp 11 (with the cables passing therethrough) can be removed as a unit.

The stop piston 33 threads onto the stud 59 at the upper end of piston tube 15. This piston provides the seal between reactor pressure and the area above the drive piston. It also functions as a positive-end stop at the upper limit of drive piston travel. Six spring washers 30 below the stop piston help absorb the final mechanical shock at the end of travel. Seals 34 include an upper pair used to maintain pressure above the drive piston during CRD withdrawal and a lower pair used only during the cushioning of the drive piston at the upper end of the stroke. Two external bushings 32 prevent metal-to-metal contact between stop piston 33 and index tube 26.

As seen in FIG. 2B, spud 46, which connects the control rod and CRD, is threaded onto the upper end of index tube 26 and held in place by locking band 44. Six spring fingers permit the spud to enter the mating socket on the control rod. A lock plug (not shown) then enters the spud from the socket and prevents uncoupling. The control rod can be uncoupled by lifting the lock plug by raising an uncoupling rod consisting of rod 48 and tube 43.

An outer filter 45 and the inner filter 41 are installed near the upper end of the CRD. Both are provided to filter reactor water flowing into the CRD, removing foreign particles or abrasive matter that could result in internal damage and excessive wear.

The outer filter assembly 45 consists of a ring with a flange on its outer periphery, a perforated cylinder for supporting a woven wire filter cloth, and a guide welded together. The outer filter is installed on the CRD by three lock-wired screws 40 which secure the lower end of outer filter 45 to guide cap 39. Outer filter 45 removes foreign particles from reactor water entering the annulus between the CRD outer tube and the thermal sleeve (not shown) in the reactor vessel CRD housing.

A strainer 36 consists of a perforated cylinder which encloses a coarse wire screen and is secured by three flat-head screws 5. Strainer 36 reduces the entry of coarse foreign particles from reactor water into the scram ports and ball-check valve in the CRD flange in the event such particles penetrate or bypass the outer filter 45.

The inner filter assembly 41 consists of a ring with a grooved flange on its outer periphery and an ungrooved flange on its inner periphery, a perforated cylinder for supporting a woven wire filter cloth, and a spring retainer assembly welded together. The inner filter prevents entry of particulate matter with reactor water entering the interior of the CRD through the coupling spud 46. A center lug 44 at the top of stop piston 33 is provided for mounting inner filter 41. The inner filter is held in place by a spring clip 42 which grips lug 44. The outside of the ring at the top of the filter cylinder is hard-surfaced to reduce wear from contact with the inside wall of index tube 26 and is sealed against water leakage by means of a seal ring 50 installed in the groove in the ring.

During maintenance of a CRD, following removal of the outer filter, uncoupling rod and spud, the inner filter is removed. This filter has been exposed to fields of radiation during reactor operation. Historically, long-handled tongs or grippers have been used to handle the inner filter. For example, in a known gripper, a handle is operated to retract a shaft relative to a stationary support. An expandable element has one end secured to the shaft and the other end secured to the support. Upon retraction of the shaft, the expandable component is compressed and expanded to the extent that its outer periphery engages and thereby captures the inner filter. The inner filter is then slid out by pulling out the gripper tool.

SUMMARY OF THE INVENTION

The present invention is an improved tool for removing the highly contaminated inner filter from the CRD during a maintenance operation. The tool may also be used to install the inner filter by pushing the inner filter on and locking the spring clip onto flats of the center lug of the CRD stop piston.

The tool for pulling out the inner filter comprises a collet with flexible fingers which are inserted inside the inner filter while flexed radially inward. After the collet is inserted, a retractable cam with a conical bearing surface is retracted to a position whereat it urges the collet fingers radially outward to clamp the collet onto the inner filter. The locked filter must be rotated before removal. With the inner filter coupled to the collet, the tool is then pulled out to remove the inner filter from the CRD.

DETAILED DESCRIPTION OF THE PREFERRED EMBODIMENTS

Figure 1:
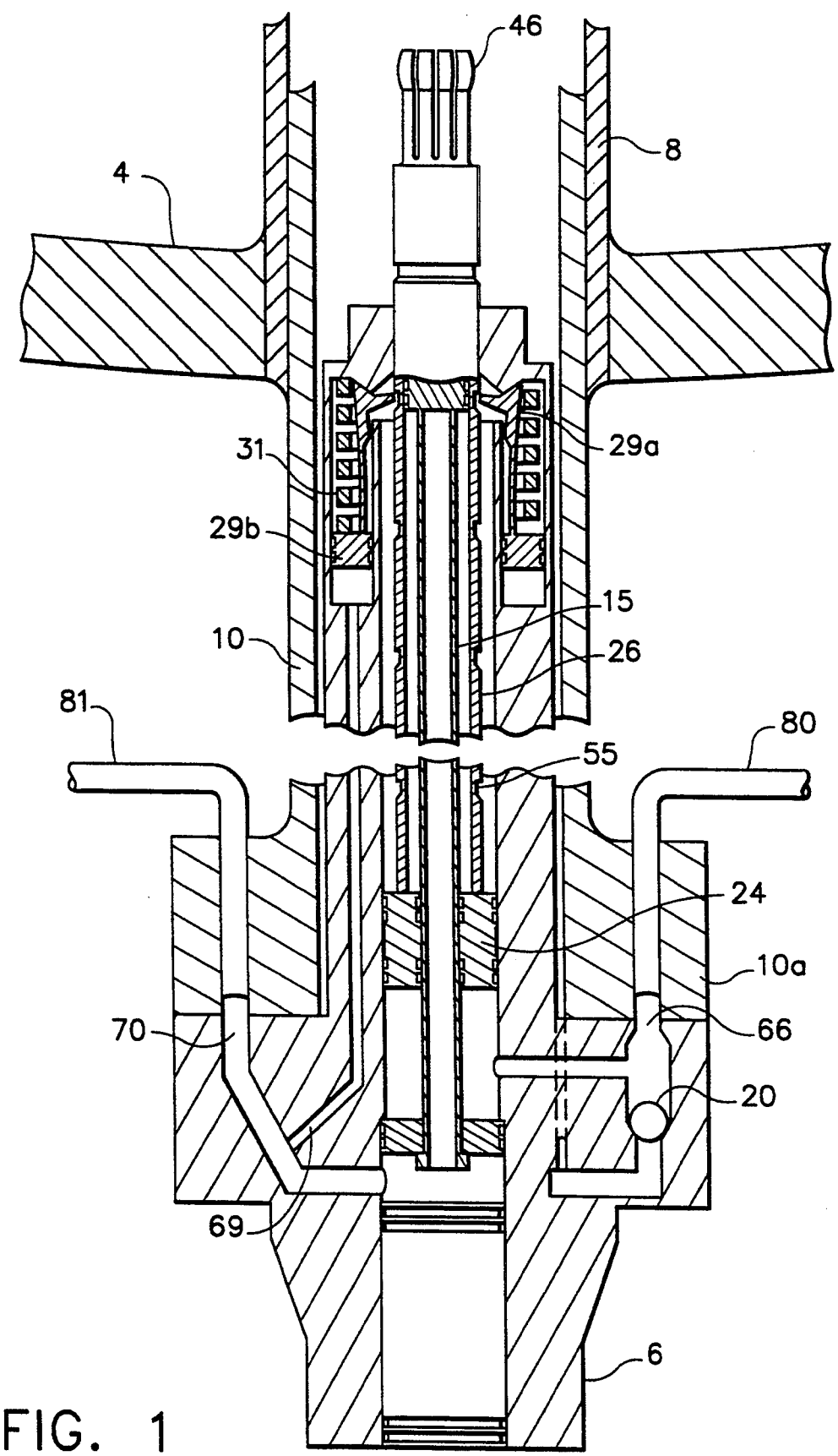
FIG. 1 is a sectional schematic of a conventional control rod drive installed in a BWR.
Figure 2A:
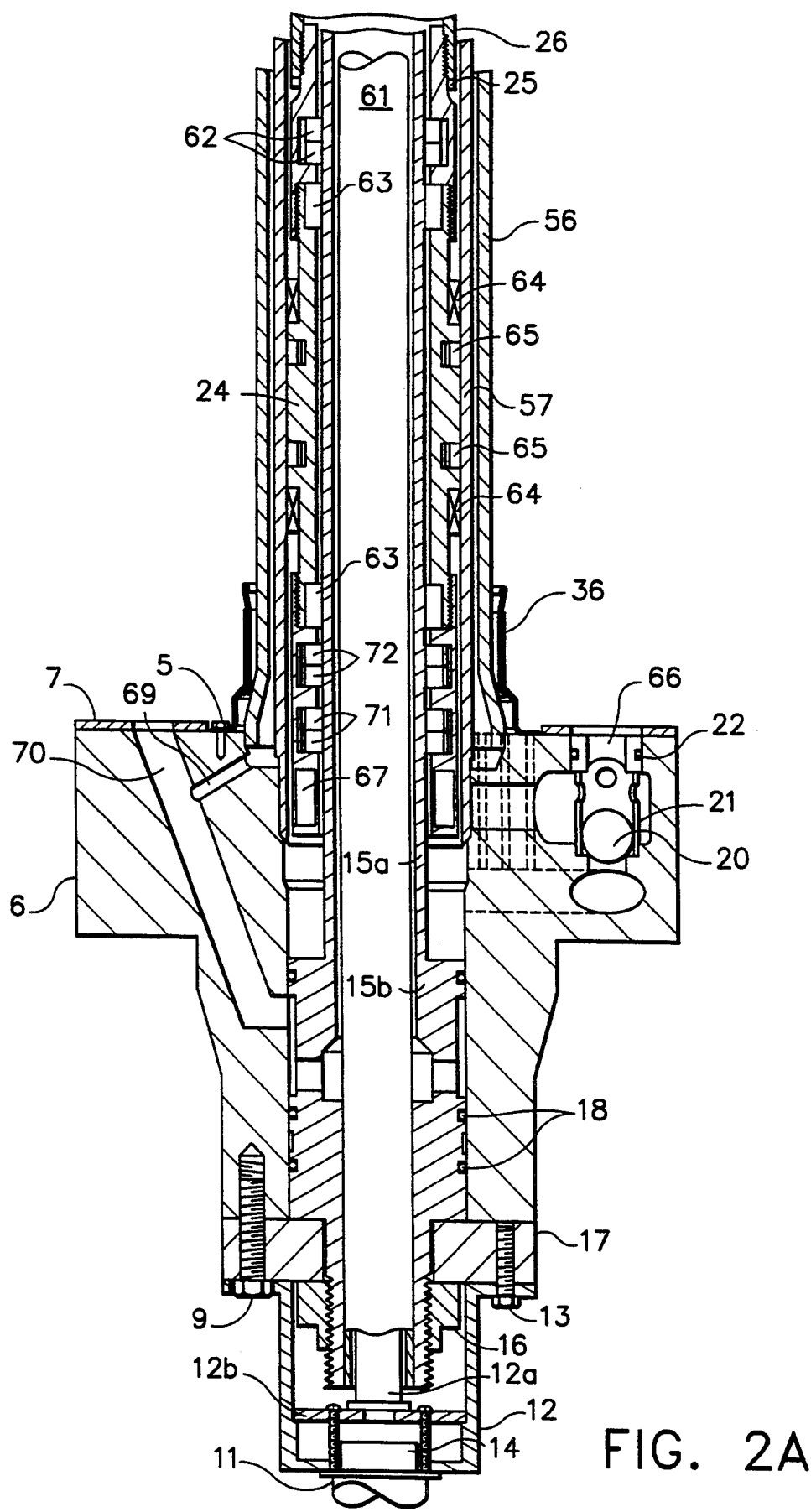
FIGS. 2A and 2B are sectional views of the lower and upper portions respectively of a conventional control rod drive.
Figure 2B:
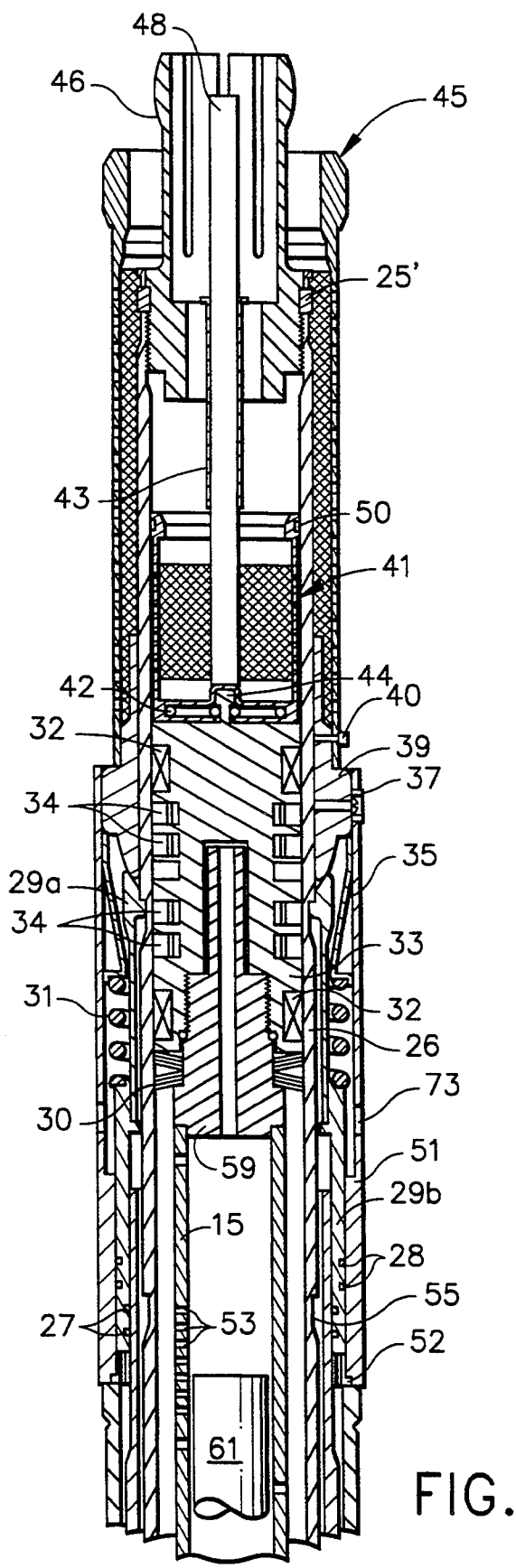
Figure 3:
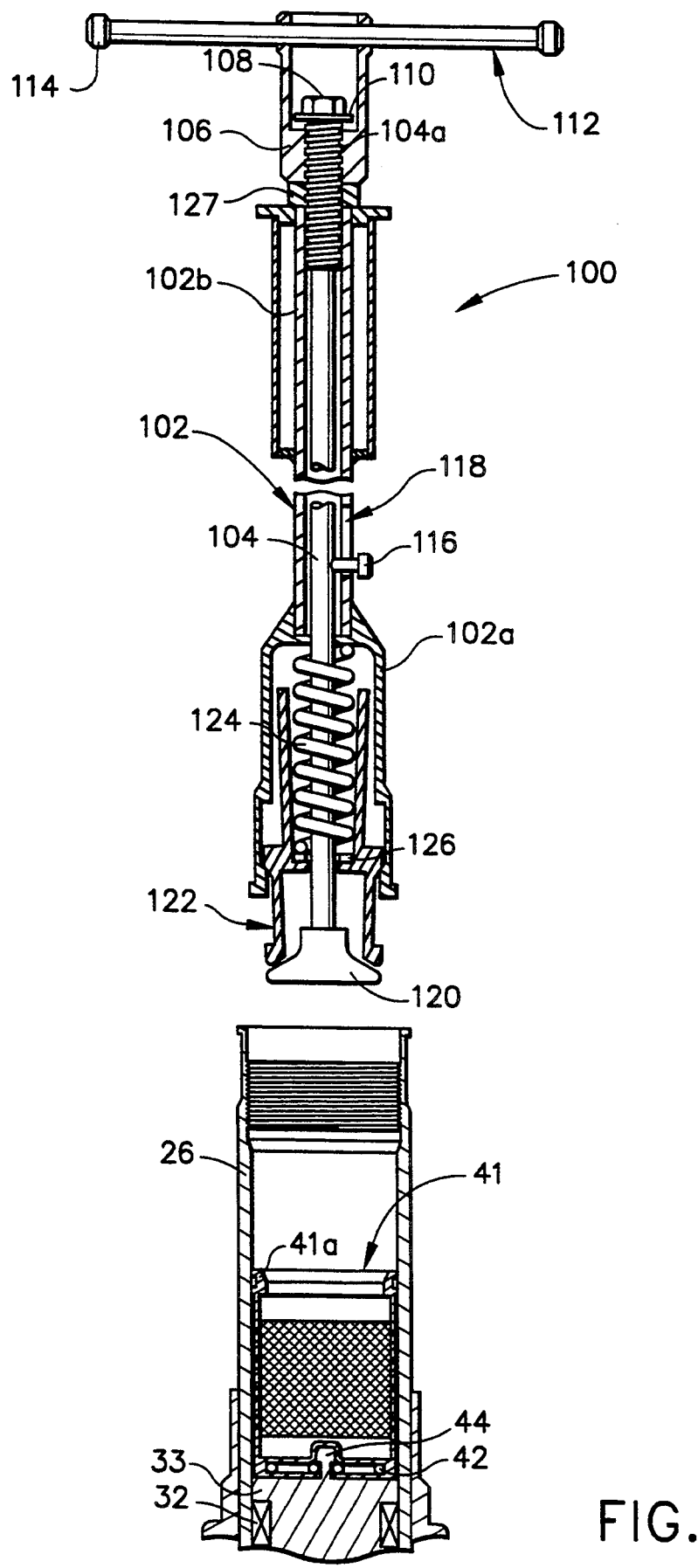
FIGS. 3 through 5 are sectional views showing the inner filter removal tool in accordance with the invention before, during and after coupling of the tool to the inner filter respectively.

In accordance with a preferred embodiment of the invention depicted in FIG. 3, an inner filter removal tool 100 comprises a welded housing 102 including a collet retaining housing 102a at one end and a shaft housing 102b for receiving a shaft 104. Shaft 104 has a threaded portion 104a which is threadably coupled in the threaded bore of a nut 106. A second nut 108 is screwed onto the end of threaded portion 104a, with a washer 110 installed between nuts 106 and 108. A thrust bearing 127 is seated between nut 106 and the top of housing 102 to facilitate rotation of nut 106 relative to housing 102.

Nut 106 includes a cylindrical portion integrally connected to and extending axially upward from the threaded bore portion. This cylindrical portion is integrally connected to a flange which has a pair of diametrically opposed holes for receiving the shaft of a handle 112. A knob 114 at one end of handle 112 is screwed onto a threaded portion of the handle shaft after the latter has been inserted through the pair of holes in nut 106.

Handle 112 is turned to rotate nut 106 relative to housing 102, separated by a thrust bearing 127 to reduce rotation friction. Rotation of nut 106 in one direction causes shaft 104 to displace upwardly relative to housing 102; rotation of nut 106 in an opposite direction causes shaft 104 to displace downwardly relative to housing 102. An anti-rotation pin 116 is connected to and extends radially outward from the non-threaded portion of shaft 104. Rotation of shaft 104 relative to housing 102 is prevented by a vertical slot 118 which receives anti-rotation pin 116. Anti-rotation pin 116 travels in vertical slot 118 as shaft 104 displaces vertically in response to rotation or turning of handle 112.

Figure 6:
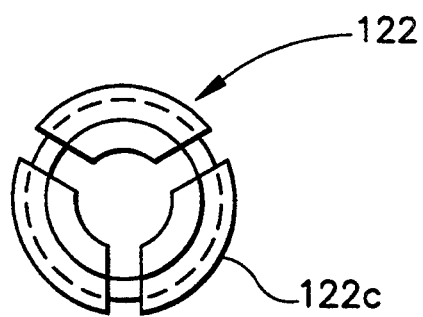
FIGS. 6 and 7 are bottom and plan views respectively of the collet in accordance with a preferred embodiment of the invention.
Figure 7:
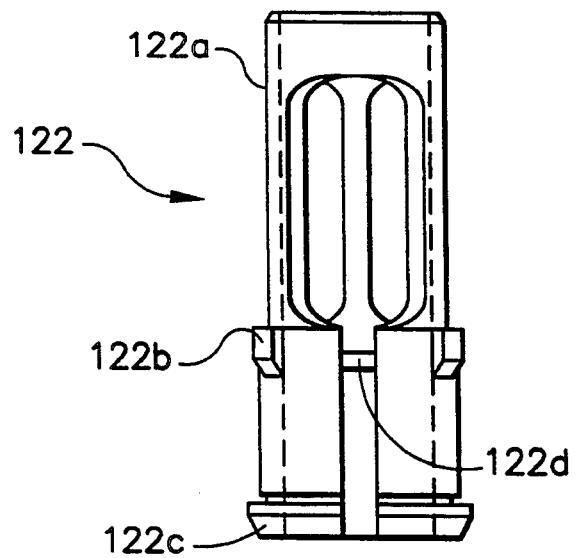

A hardened stainless steel collet 122 is slidably arranged inside the collet retainer 102a generally concentric with shaft 104. As best seen in FIGS. 6 and 7, collet 122 consists of a cylindrical top portion which connects and supports three flexible collet fingers which extend axially downward and are circumferentially distributed at equal angular intervals. Each finger comprises a flexible rib 122a, a camming projection 122b, a latching lip 122c and a radially inwardly directed washer seat 122d.

Collet 122 is urged axially downward by a coiled compression spring 124 arranged in the annular space between shaft 104 and collet 122. One end of compression spring 124 bears against housing 102 and the other end bears against a washer 126 seated on the plurality of washer seats 122d.

Figure 4:
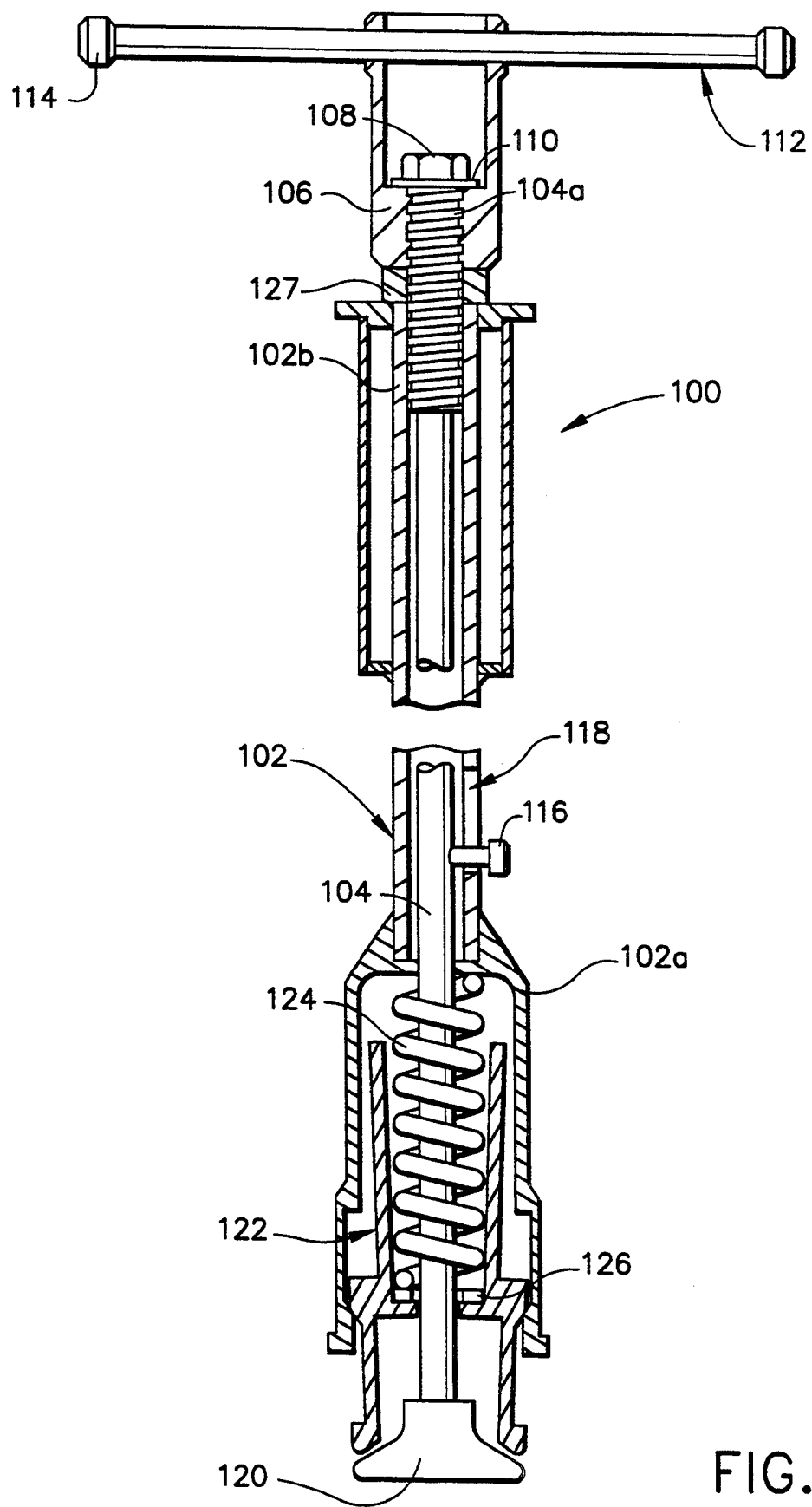

FIG. 3 shows the inner filter removal tool in a pre-inserted condition. The collet is pushed along collet retainer 102a so that camming projections 122b slide over a ramped camming surface formed on the inside of collet retainer 102a. This camming action flexes the collet fingers radially inward so that the collet can be inserted into inner filter 41 (as shown in FIG. 4) without obstruction. The collet is held in this position by compression spring 124.

Figure 5:
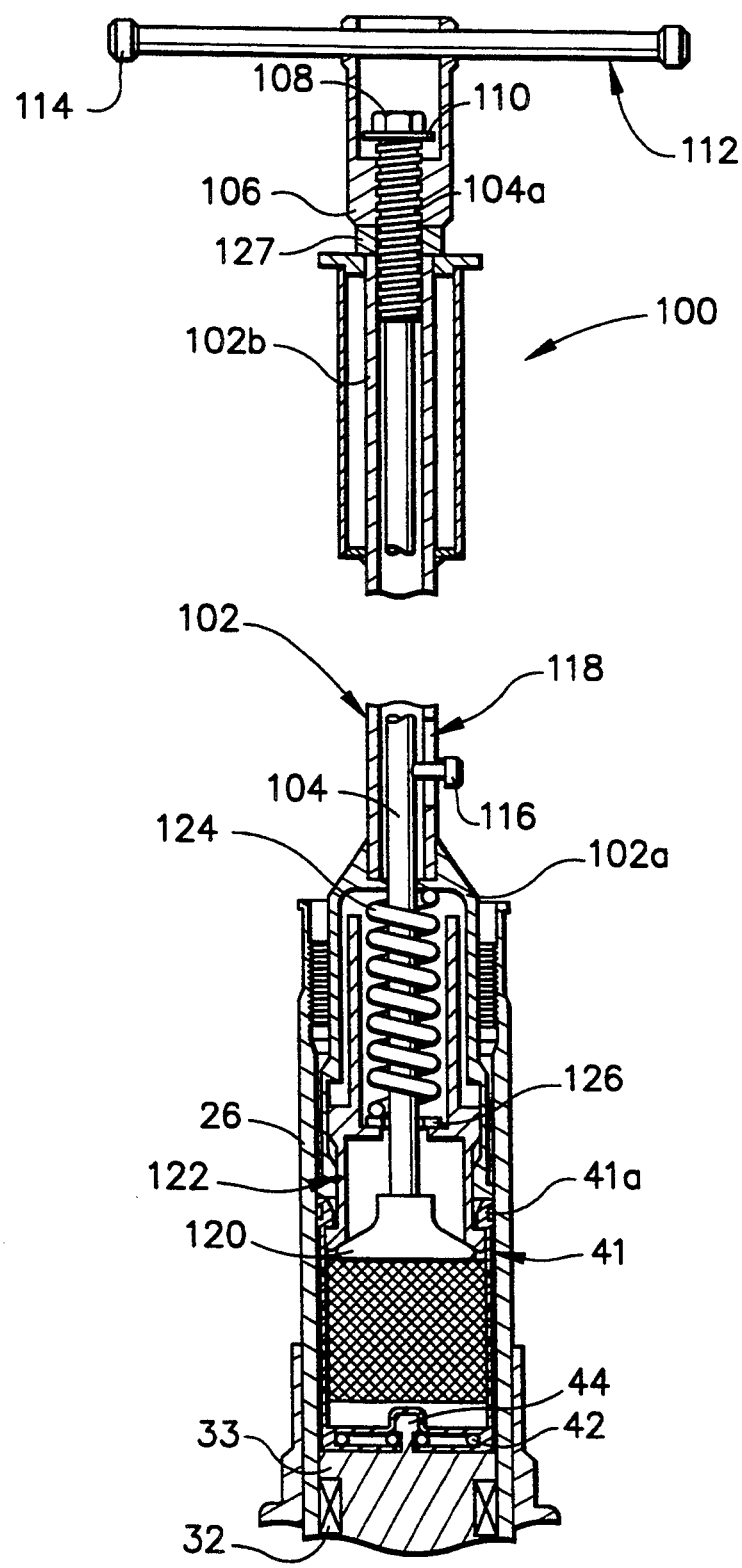

A cam 120, mounted on the lower end of shaft 104, has a conical surface which bears against the tips of the collet fingers when shaft 104 is raised in response to rotation of handle 112. The conical surface forces the flexible collet fingers to deflect radially outwardly as shaft 104 is raised. In the final retracted position shown in FIG. 5, cam 120 locks the latching lip 122c of each collet finger underneath the ungrooved flange on the inner periphery of the inner filter ring, thereby clamping the inner filter 41 to the bottom surface of the collet retainer 102a.

The clamped inner filter is removed by rotating the tool 90° (to align the spring clip 42 with the flats of center lug 44) and then pulling the tool to slide the inner filter out of the CRD. The reverse procedure can be used to install an inner filter using the inner filter removal tool of the invention.

The preferred embodiment of the inner filter removal tool has been disclosed for the purpose of illustration. Variations and modifications of the disclosed structure which do not depart from the concept of this invention will be readily apparent to mechanical engineers skilled in the art of tooling. All such variations and modifications are intended to be encompassed by the claims set forth hereinafter.

We claim:

1. A tool for removing an inner filter having a ring flange from a control rod drive, said ring flange defining a radial plane, comprising:
   latching means comprising a plurality of radially flexible latching members integrally connected to and extending from a cylindrical support means, each of said radially flexible latching members comprising a flexible rib and a radially outwardly projecting arcuate latching lip supported by said rib;
   means for retaining said latching means, said latching means being movable between extended and retracted positions inside said retaining means;
   first camming means for radially inwardly flexing said latching means in said extended position as said latching means moves from said retracted position to said extended position;
   second camming means for radially outwardly flexing said latching means and pushing said latching means from said extended position to said retracted position during retraction of said second camming means relative to said retaining means along an axis;
   an actuating element which is rotatable about said axis; and
   means for retracting said second camming means relative to said retaining means in response to rotation of said actuating element,
   wherein said latching means is clamped to latch onto said inner filter when said retaining means abuts said ring flange and said second camming means is retracted relative to said retaining means.

2. The tool as defined in claim 1, wherein said retracting means comprises:
   a shaft which is retractable relative to said retaining means, said shaft being rigidly connected to said second camming means and having a threaded portion and said actuating element being threadably engaged to said shaft; and
   a handle for manually turning said actuating element, said second camming means retracting during turning of said handle in a first direction.

3. The tool as defined in claim 2, wherein said actuating element is a nut connected to said handle and having a threaded bore screwed onto said threaded portion of said shaft.

4. The tool as defined in claim 3, further comprising anti-rotation means for blocking rotation of said shaft relative to said retaining means.

5. The tool as defined in claim 1, further comprising compression spring means for urging said latching means toward said extended position.

6. The tool as defined in claim 5, wherein each of said latching members comprises a flexible rib, a latching lip for latching said inner filter and a seat for said compression spring.

7. The tool as defined in claim 1, wherein said first camming means comprises a plurality of camming projections formed on said latching means and a ramped inner surface formed on said retaining means.

8. The tool as defined in claim 1, wherein each of said latching members comprises a flexible rib and a latching lip for latching said inner filter, said latching lips projecting radially outwardly.

9. The tool as defined in claim 8, wherein said second camming means comprises a cam having a camming surface in the shape of a surface of revolution and is sized to abut each of said latching members when said retracted second camming means engages said latching means, said radially outward flexure of said latching members being produced by the force of said camming surface bearing thereon.

10. The tool as defined in claim 9, wherein said camming surface is conical.

11. A tool for removing a first generally cylindrical component from a second generally cylindrical component, said first generally cylindrical component having a radially inwardly projecting flange on its inner periphery, comprising:
   a shaft having a threaded portion at one end;
   a cam mounted securely on the other end of said shaft and having a camming surface in the shape of a surface of revolution about said shaft longitudinal axis;
   a shaft housing having a cylindrical channel therethrough for receiving a portion of said shaft;
   first and second anti-rotation means mutually coupled to allow said shaft to translate along its longitudinal axis while blocking rotation about said longitudinal axis and relative to said shaft housing;
   a nut having a threaded bore which threadably engages said threaded portion of said shaft, said nut being effectively supported by and rotatable relative to said shaft housing, whereby said shaft translates along its longitudinal axis during rotation of said nut;
   a collet having a plurality of radially flexible fingers circumferentially distributed about a ring-like portion, each of said radially flexible fingers comprising a flexible rib and a radially outwardly projecting arcuate latching lip supported by said rib; and a collet housing rigidly connected to said shaft housing and having a chamber for receiving said collet, said chamber having an open end and an axis generally collinear with said shaft longitudinal axis, said collet being axially slidable in said chamber with said fingers of said collet protruding out said open end of said collet housing chamber, wherein said cam is translatable between first and second axial positions in response to rotation of said nut through a predetermined angle, said camming surface bearing on said fingers to cause radially outward flexure thereof during translation of said cam in a direction away from said first axial position and toward said second axial position.

12. The tool as defined in claim 11, wherein each of said collet fingers has a camming projection extending radially outwardly therefrom,-and said collet housing has a ramped inner surface formed therein, said ramped inner surface bearing on said camming projection to cause radially inward flexure thereof when said collet is in a predetermined axial position relative to said collet housing.

13. The tool as defined in claim 11, wherein said first anti-rotation means is a pin connected to said shaft and said second anti-rotation means is a slot formed in said shaft housing.

14. The tool as defined in claim 11, wherein said camming surface is conical.

15. A tool for removing a first generally cylindrical component from a second generally cylindrical component, said first generally cylindrical component having a radially inwardly projecting flange on its inner periphery, comprising:

a shaft having a threaded portion at one end;

a cam mounted securely on the other end of said shaft and having a camming surface in the shape of a surface of revolution about said shaft longitudinal axis;

a shaft housing having a cylindrical channel therethrough for receiving a portion of said shaft;

first and second anti-rotation means mutually coupled to allow said shaft to translate along its longitudinal axis while blocking rotation about said longitudinal axis and relative to said shaft housing;

a nut having a threaded bore which threadably engages said threaded portion of said shaft, said nut being effectively supported by and rotatable relative to said shaft housing, whereby said shaft translates along its longitudinal axis during rotation of said nut;

a collet having a plurality of radially flexible fingers circumferentially distributed about a ring-like portion; and a collet housing rigidly connected to said shaft housing and having a chamber for receiving said collet, said chamber having an open end and an axis generally collinear with said shaft longitudinal axis, said collet being axially slidable in said chamber with said fingers of said collet protruding out said open end of said collet housing chamber, wherein said cam is translatable between first and second axial positions in response to rotation of said nut through a predetermined angle, said camming surface bearing on said fingers to cause radially outward flexure thereof during translation of said cam in a direction away from said first axial position and toward said second axial position, further comprising compression spring means for urging said collet toward said open end of said collet housing.

16. The tool as defined in claim 12, wherein each of said fingers comprises a flexible rib, a radially outwardly projecting arcuate latching lip and a seat for said compression spring, said plurality of latching lips lying along a circle when said flexible ribs are in an unflexed state.

17. A tool comprising:

a shaft having a threaded portion at one end;

a cam mounted securely on the other end of said shaft and having a camming surface in the shape of a surface of revolution about said shaft longitudinal axis;

a shaft housing having a cylindrical channel therethrough for receiving a portion of said shaft;

a nut having a threaded bore which threadably engages said threaded portion of said shaft, said nut being effectively supported by and rotatable relative to said shaft housing, whereby said shaft translates along its longitudinal axis during rotation of said nut;

a collet having a plurality of radially flexible fingers circumferentially distributed about and integrally connected to a ring-like portion, each of said radially flexible fingers comprising a flexible rib and a radially outwardly projecting arcuate latching lip supported by said rib, said latching lip having a contact surface generally disposed in a radial plane; and a collet housing rigidly connected to said shaft housing and having a chamber for receiving said collet, said chamber having an open end and an axis generally collinear with said shaft longitudinal axis, said collet being axially slidable in said chamber with said fingers of said collet protruding out said open end of said collet housing chamber, wherein said cam is translatable between first and second axial positions in response to rotation of said nut through a predetermined angle, said camming surface bearing on said fingers to cause radially outward flexure thereof during translation of said cam in a first direction away from said first axial position and toward said second axial position.

18. The tool as defined in claim 17, further comprising a compression spring arranged to urge said collet in a second direction opposite to said first direction, wherein each of said fingers further comprises a seat for said compression spring.

19. The tool as defined in claim 17, wherein each of said collet fingers has a camming projection extending radially outwardly therefrom, and said collet housing has a ramped inner surface formed therein, said ramped inner surface bearing on said camming projection to cause radially inward flexure thereof when said collet is in a predetermined axial position relative to said collet housing.

20. The tool as defined in claim 17, further comprising first and second anti-rotation means mutually coupled to allow said shaft to translate along its longitudinal axis while blocking rotation about said longitudinal axis and relative to said shaft housing, wherein said first anti-rotation means is a pin connected to said shaft and said second anti-rotation means is a slot formed in said shaft housing.

* * * * *